UNITED STATES PATENT OFFICE.

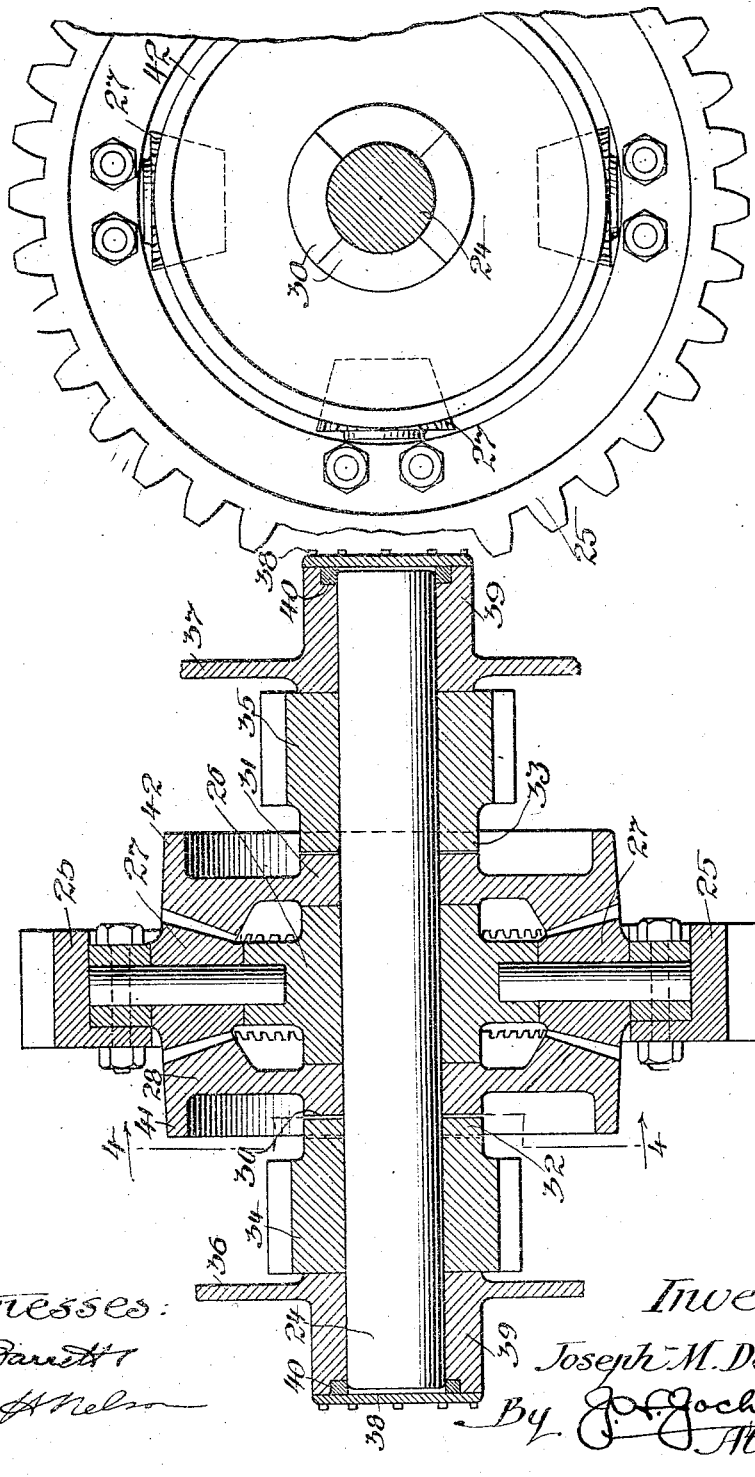

JOSEPH M. DENNING, OF CEDAR RAPIDS, IOWA, ASSIGNOR TO DENNING TRACTOR COMPANY, OF CEDAR RAPIDS, IOWA, A CORPORATION OF IOWA.

DIFFERENTIAL-GEAR MECHANISM.

1,279,670.  Specification of Letters Patent.  Patented Sept. 24, 1918.

Original application filed September 4, 1915, Serial No. 49,099. Divided and this application filed March 23, 1916. Serial No. 86,083.

*To all whom it may concern:*

Be it known that I, JOSEPH M. DENNING, a citizen of the United States, residing at Cedar Rapids, in the county of Linn and State of Iowa, have invented certain new and useful Improvements in Differential-Gear Mechanism, of which the following is a specification.

This application is a division of original application Ser. No. 49099, filed September 4th, 1915, and relates more particularly to the differential gear mechanism and one of the objects of the invention is to provide an improved form of differential gearing in which the parts are mounted upon and alined by a shaft commonly known as a "jack shaft," the construction of the gearing being such that the gears are entirely detached from and operate independently of the shaft, the shaft being removable independently of the gear, thereby not only lessening the cost of manufacture by dispensing with the use of keys and fastening devices, but the assembling of the parts is facilitated.

A further object is to provide an improved form of differential gearing having combined therewith a brake applying surface.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating the invention and in which:

Figure 1 is a vertical sectional view of the differential gearing and brake drum.

Fig. 2 is a view taken on line 4—4, Fig. 1.

Referring more particularly to the drawings, the numeral 24 designates a shaft commonly known as a "jack shaft" which supports the differential gearing, and which latter preferably comprises a ring gear 25, and constitutes the driving member. This ring gear is secured to a spider 26, also rotatably supported by the shaft 24. Rotatably supported by the spider 26 are a plurality of bevel pinions 27, preferably four in number, which rotate with the spider about the shaft 24, and also rotate independently with respect to the spider on an axis arranged transversely to the axis of rotation of the spider. These bevel pinions 27 mesh with bevel gears 28, 29 arranged on each side of the spider 26 and rotate about the shaft 24. Each of the gears 28, 29 is provided with jaws 30, 31 on the outer faces of their hubs, and with which jaws, coöperating jaws 32, 33 carried by pinions 34, 35, mesh. These pinions 34, 35 are also rotatably supported by the shaft 24 and the jaws on the pinions are held in contact with the jaws on the bevel gears by means of the walls 36, 37 of the gear casing.

The shaft 24 is held against longitudinal displacement in any suitable manner preferably by means of caps 38, which are secured to the bearing 39 in which the shaft is journaled, and gaskets 40 may be provided to form a fluid tight connection or joint between the cap and bearing so that the gear casing will be liquid tight, thereby rendering it possible to fill the casing with lubricant in which the gears rotate.

The gear 28 is provided with a flange 41 and the gear 29 is provided with a flange 42, the peripheries of which are preferably arranged in line with the bottom of the teeth of the respective gears and form brake drums around each of which a brake band extends.

While the preferred form of construction has been herein shown and described, it is to be understood that many changes may be made in the details thereof, without departing from the spirit of this invention.

What is claimed as new is:

A differential gearing embodying a shaft, a gear freely rotatable about the shaft, pinions supported by the gear within the periphery thereof for rotation with the gear and for independent rotation with respect to the gear and about axes transverse to the axis of rotation of the supporting gear, a brake drum rotatable about the shaft on each side of the first said gear, said drum having lateral teeth meshing with the said pinions, pinions also rotatable about the shaft adjacent the outer face of each of the drums, and interengaging means on the last recited pinions and the respective adjacent drums for locking the gear and drum together, the said shaft being freely removable wholly or partially from the said parts.

In testimony whereof I have signed my name to this specification, in the presence of two subscribing witnesses, on this 17th day of March A. D. 1916.

JOSEPH M. DENNING.

Witnesses:
A. H. DECKMAN,
H. A. HOFFERD.

Copies of this patent may be obtained for five cents each, by addressing the "Commissioner of Patents, Washington, D. C."